United States Patent [19]

Isaksson

[11] 4,131,419
[45] Dec. 26, 1978

[54] FURNACE FOR THE HIGH TEMPERATURE-HIGH PRESSURE TREATMENT OF MATERIALS WHICH INCLUDES PRESSURE MEDIUM CIRCULATION CHANNELS

[75] Inventor: Sven-Erik Isaksson, Robertsfors, Sweden

[73] Assignee: ASEA Aktiebolag, Vasteras, Sweden

[21] Appl. No.: 798,863

[22] Filed: May 20, 1977

[30] Foreign Application Priority Data

May 25, 1976 [SE] Sweden .............................. 7605887

[51] Int. Cl.² ............................................... F27B 5/04
[52] U.S. Cl. ...................................... 432/205; 13/31 R
[58] Field of Search ...................... 432/205, 203; 13/31

[56] References Cited

U.S. PATENT DOCUMENTS

| | | | |
|---|---|---|---|
| 3,548,062 | 12/1970 | Smith, Jr. ................................ | 13/31 |
| 3,993,433 | 11/1976 | Isaksson et al. ....................... | 432/433 |
| 4,003,697 | 1/1977 | Elmgren ................................. | 13/31 |

Primary Examiner—John J. Camby
Attorney, Agent, or Firm—Watson, Cole, Grindle & Watson

[57] ABSTRACT

A high temperature-high pressure furnace which includes a cylindrical pressure chamber formed of a hollow cylindrical wall and two end closures therefor, a cylindrical sheath positioned within the cylindrical wall to provide a gap therebetween, and heaters positioned within the cylindrical sheath in order to provide a furnace space therewithin. The sheath at one end is sealingly connected to one of the end closures and at the other end is provided with a channel to provide fluid communication between the furnace space and the gap when an insulating lid is positioned over this other end of the sheath. The end closure to which the sheath is sealingly connected is provided with passageways which allow for fluid circulation therethrough and between the gap and the furnace space.

6 Claims, 3 Drawing Figures

FURNACE FOR THE HIGH TEMPERATURE-HIGH PRESSURE TREATMENT OF MATERIALS WHICH INCLUDES PRESSURE MEDIUM CIRCULATION CHANNELS

BACKGROUND OF THE INVENTION

The present invention relates to furnaces used for the isostatic treatment of products in a gaseous atmosphere at high temperatures and high pressure. More specifically, the present invention deals with furnaces used for the pressure sintering of powdered materials, such as metal powders, ceramic powders, or mixtures thereof, to form homogeneous solid bodies.

Pressure furnaces known to the prior art such as cylindrical elongated furnaces which can treat products at 1000° C. or above at pressures of 500 bar or above are normally quite complicated and expensive. In most of these furnaces the hot billet, immediately after being pressed, can be removed from the furnace in order to reduce the operational cycle time. In some furnaces which are constantly kept warm, i.e., furnaces in which the billet is inserted into the furnace when warm and wherein the warm billet is removed therefrom immediately after pressing, charging thereof can be accomplished from below, and in these furnaces the surrounding air (the oxygen of which damages the furnace) can be prevented from flowing in without the help of complicated hoods and the like. In other furnaces which are charged from above, the furnace can be allowed to cool to a temperature at which the incoming oxygen in the air does not damage the furnace. Indeed, in certain situations it is acceptable or desirable that the pressed billet be allowed to partly or completely cool under pressure such that the ultimately desired properties be obtained.

To accelerate the cooling in these furnaces, it has been proposed to arrange a passageway, controllable by a valve from the outside, between the furnace space inside the conventional insulating casing and the gap between the insulating casing and the inner wall of the pressure chamber cylinder. The heat is then carried off through the cylinder wall and by means of a coolant circulating through channels in the pressure chamber cylinder. However, opening the valve in such a passageway and thereby regulating the flow of hot pressure medium without regard to the desired cooling rate, and not recognizing the harmful effects of heating of the cylinder wall, has lead to various practical problems.

The object of the present invention is to provide a pressure furnace which is improved over prior art furnaces. The present inventive furnace, it should be noted, is applicable as the furnace described in U.S. Pat. No. 3,995,101.

SUMMARY OF THE INVENTION

The inventive pressure furnace is constructed to include a sheath as part of the insulated casing within the pressure cylinder walls of a pressure chamber, the sheath being positioned with one end in a gas-tight fashion to an end closure of the pressure chamber and so as to form a furnace space therewithin and a gap between itself and the surrounding pressure cylinder walls. By means of channels in the sheath at the end opposite the end in contact with the end closure, fluid communication is provided between the furnace space and the noted gap. Further channels are provided in the noted end closure for fluid communication therethrough and between the noted gap and the furnace space, a valve being appropriately connected to these further channels to regulate fluid flow.

In one embodiment the insulated casing includes a removable insulating lid positioned to close the furnace space and to seal the sheath at the end opposite the end in contact with the end closure, so that the furnace is chargable from above. In this embodiment there are channels in the noted end closure which are connected to a conduit circuit positioned outside the pressure chamber. The fluid flow valve is positioned in this external conduit circuit. This conduit circuit is constructed such that the heating thereof does not give rise to detrimental stresses. Cooling of the circulated fluid can be enhanced by incorporating a cooling device in the conduit circuit.

The conduit circuit may include a circulating pump to enhance transport of the pressure medium.

In another embodiment of the invention, the channels in the end closure as well as the valve for controlling fluid flow may be entirely within the end closure. These channels may comprise separate inserts in recesses formed in the end closure, and these inserts may be insulated from the surrounding walls of the end closure or else cooled by a cooling medium circulating therearound.

The invention provides wide limits of freedom in choosing a cooling rate that is well adapted to the economic and technical desires and requirements of the particular treatment. In those situations where a rapid cooling is desired, the fluid (gas) flow is regulated depending on the ability of the pressure chamber cylinder to carry off heat at a maximally allowed wall temperature. (A cooled pressure chamber of the kind described in U.S. Pat. No. 3,900,189 may be used). A high pressure may be maintained which allows for a high heat transport. In those situations wherein the treatment requires an adjusted cooling rate and an adjusted pressure during the cooling, the cooling rate and the pressure can be regulated in accordance with a developed temperature-pressure curve.

Further objects, advantages and features of the invention will be apparent in the arrangement and construction of the constituent parts in detail as set forth in the following discussion taken together with the accompanying drawings.

DETAILED DESCRIPTION OF THE PREFERRED EMBODIMENTS

Figure 1:
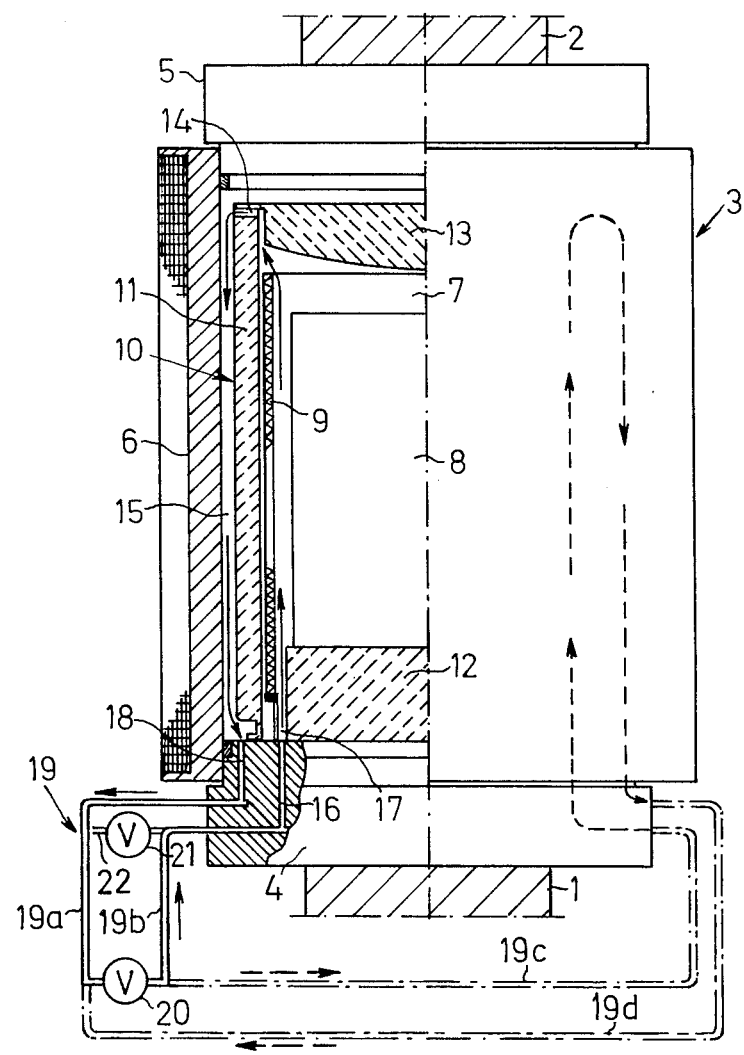
FIG. 1 depicts an embodiment of the inventive furnace, and more specifically the positioning of an embodiment of the inventive pressure chamber between two force-absorbing elements of a press stand, the Figure showing partly in schematic and partly in section the valves, conduits and channels for pressure medium circulation.

As can be seen from the various figures, a pressure chamber 3 is positioned between opposite force-absorbing elements 1, 2 which are part of a conventional press stand (not shown). During a pressing operation, elements 1 and 2 function to hold the end closures 4, 5 of the pressure chamber in the positions shown, i.e., within cylinder 6, and function to absorb the compressive forces acting axially outwardly on the two end closures. Within the pressure chamber 3 is a furnace space 7 which surrounds a workpiece 8 that is supported on an insulating bottom 12, and positioned along the sides of furnace space 7 is a heater 9. Encompassing heater 9 is an insulating casing 10 which includes a cylindrical, insulating sheath 11 which at one end is connected in a gas-tight fashion to the (lower) end closure 4 and which at the other end is positioned to allow an insulating lid 13 to be positioned thereover. The insulating lid 13 is removable from within the pressure chamber 3, and in fact is removed during charging of the pressure chamber.

Located at the upper part of the sheath 11 is a channel 14 which functions to provide fluid communication between the furnace space 7 and a gap 15 which is located between the sheath 11 and the cylinder 6.

Formed within (lower) end closure 4 is a first channel 16 which opens into the gap 17 between heater 9 and bottom 12, and which angles at about a right angle to open out to the side of end closure 4. Gap 17 provides for direct fluid communication between first channel 16 and furnace space 7. Also formed within (lower) end closure 4 is a second channel 18 which opens into the gap 15 and which angles at about a right angle to open out to the side of end closure 4.

Connected to each of channels 16 and 18 is a conduit circuit 19 which includes conduits 19a and 19b separately connected to channels 18 and 16, respectively. A cut-off and regulating valve 20 is interconnected between conduits 19a and 19b; in addition, a valve 21 is positioned in a conduit 22 which at one end is interconnected with conduit 19b and at its opposite end with a source of pressure medium. Pressure medium (gas) can thus be introduced into conduit 22 and be conveyed into the pressure chamber 3 and throughout the conduit circuit 19.

As shown in FIG. 1, an additional conduit circuit which includes conduits 19c and 19d may be utilized to provide pressure medium circulation to the opposite side of pressure chamber 3 from that shown in section in FIG. 1.

In operation, and with pressure medium already supplied to the conduit circuit and the pressure chamber and valve 20 opened, a self-circulation is obtained in the direction of the arrows because the medium (gas) in gap 15 will be cooler than the medium (gas) in furnace space 7, and being cooler will also be heavier and will fall thus creating a driving power. Pressure medium flow will occur through valve 20, conduit 19b, channel 16, gap 17, furnace space 7, channel 14, gap 15, channel 18 and conduit 19a. A circulation as shown in the right-hand part of FIG. 1 is obtained when the additional conduit circuit is utilized.

Figure 2:
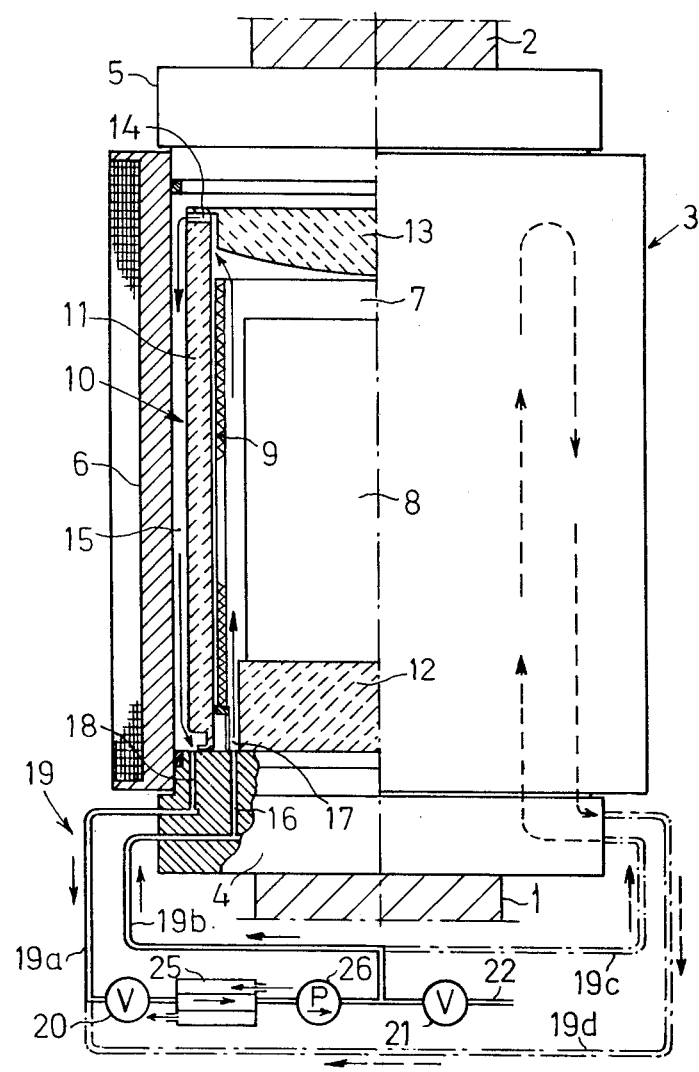
FIG. 2 depicts another embodiment of the inventive furnace wherein a cooling heat exchanger is utilized in the pressure medium circulation conduits located externally of the inventive pressure chamber.

FIG. 2 depicts an embodiment of the furnace wherein the conduit circuit 19 is modified over the system shown in FIG. 1. In this embodiment, a heat exchanger 25 is positioned in series with the valve 20, together with a circulating pump 26 which functions to produce fluid flow in the direction shown by the arrow. Due to the fact that the heat exchanger 25 is located externally of the pressure chamber 3 and by use of the pump 26, the cooling of the medium (gas) in the conduit circuit is greatly enhanced.

Figure 3:
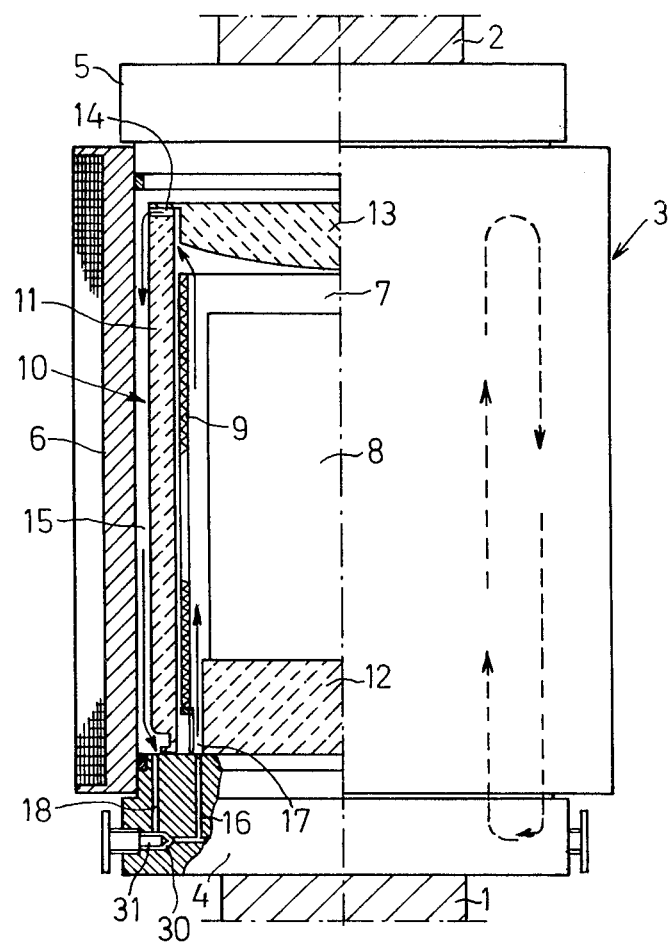
FIG. 3 depicts another embodiment of the inventive furnace wherein the valves and conduits for pressure medium circulation externally of the pressure chamber are eliminated and the pressure medium channels for pressure medium circulation are arranged entirely within the lower of the end closures of the inventive pressure chamber.

FIG. 3 depicts an embodiment of the furnace wherein the channels 16 and 18 open into a valve housing 30 in the (lower) end closure 4, the valve housing including a needle valve 31. In this embodiment, no external circulation conduits are needed as in FIGS. 1 and 2 and yet appropriate pressure medium flow and control thereof can still be achieved.

It should be noted that additional variants within the scope of the invention are feasible. For example, to increase the cooling effect even further it may be desirable to pump cooled medium (gas) into gap 15 in such a way that it will mix with the warm medium (gas) which flows out through channel 14 from the furnace space 7. In this way, the temperature of the gas in gap 15 will be reduced and thus the inner wall of the cylinder 6 will be kept at a lower temperature such that heat stresses thereon will be reduced.

While there has been now shown and described what are considered to be the preferred embodiments of the present invention, it will be obvious to those skilled in the art that various changes and modifications may be made therein without departing from the invention as defined in the appended claims.

I claim:

1. In a furnace for the isostatic hot pressing of a workpiece which comprises:
    a hollow cylinder;
    separate end closures for sealing the open ends of the pressure cylinder, the end closures projecting into the cylinder;
    heating members positioned within the pressure cylinder defining therewithin a furnace space; and
    an insulated casing surrounding the furnace space and the heating members, the insulated casing including an insulating sheath supported at one end by a first of the separate end closures;
    the improvement wherein:
    said insulating sheath is fixedly connected at said one end to said first end closure in a gas-tight fashion, and in such an orientation to provide a gap between itself and the inner wall of the hollow pressure cylinder;
    said insulating sheath includes a channel means therein at the end thereof opposite to the end connected to said first end closure so as to provide fluid communication between said furnace space and said gap; and
    said first end closure includes means for providing two paths for pressure gas communication therethrough, one path to supply pressure gas to said furnace space and one path to provide pressure gas exit from said gap and thus, together with said channel means, provide circulation of said pressure gas to cool same, and pressure gas supply means for said two paths, said supply means including a valve means.

2. A furnace according to claim 1 wherein said means for providing two paths for pressure gas communication through said first end closure and between said gap and said furnace space includes two separate channel means in said first end closure and wherein said supply means comprises a conduit circuit interconnecting said separate channel means, said valve means being connected in said conduit circuit for controlling the pressure gas flow through said conduit circuit.

3. A furnace according to claim 2 wherein said conduit circuit includes a cooler means.

4. A furnace according to claim 3 wherein said cooler means comprises a heat exchanger, and wherein said heat exchanger is connected in series with said valve means.

5. A furnace according to claim 4 wherein said conduit circuit includes a pump, and wherein said pump is connected in series with both said heat exchanger and said valve means.

6. A furnace according to claim 1 wherein said means for providing two paths for pressure gas communication through said first end closure and between said gap and said furnace space consists of a single channel means in said first end closure, and wherein a valve means is located within said first end closure for controlling the pressure gas flow through said single channel means.

* * * * *